United States Patent [19]
Pelstring

[11] Patent Number: 6,057,616
[45] Date of Patent: May 2, 2000

[54] STATOR INTERCONNECT RING

[75] Inventor: Robert Michael Pelstring, Santa Cruz, Calif.

[73] Assignee: Seagate Technology, Inc., Scotts Valley, Calif.

[21] Appl. No.: 09/054,335

[22] Filed: Apr. 2, 1998

[51] Int. Cl.[7] .................................................. H02K 11/00
[52] U.S. Cl. .............................................. 310/71; 310/156
[58] Field of Search ....................................... 310/71, 156

[56]  References Cited

U.S. PATENT DOCUMENTS

| | | |
|---|---|---|
| 5,313,128 | 5/1994 | Robinson et al. ......................... 310/71 |
| 5,481,144 | 1/1996 | Dunfield et al. .......................... 310/71 |
| 5,541,787 | 7/1996 | Jabbari et al. ........................ 360/97.01 |
| 5,661,352 | 8/1997 | Oguchi et al. .............................. 310/71 |

*Primary Examiner*—Elvin Enad
*Assistant Examiner*—Joseph Waks
*Attorney, Agent, or Firm*—Flehr Hohbach Test Albritton & Herbert

[57]  ABSTRACT

A spindle motor incorporates a hollow shaft and a prewound stator having an interconnect ring attached to one end of the stator assembly. The interconnect ring is preferably a printed circuit or flexible printed circuit; it is bonded to the stator stack before the coils are wound, and the start and finish of each phase winding is terminated to the interconnect ring. Once the stator is assembled onto the shaft, connector wires can be fed up through the shaft and terminated at the interconnect ring. Traces on the interconnect ring join the wires to the proper phases and to the commons to control motor operation.

14 Claims, 4 Drawing Sheets

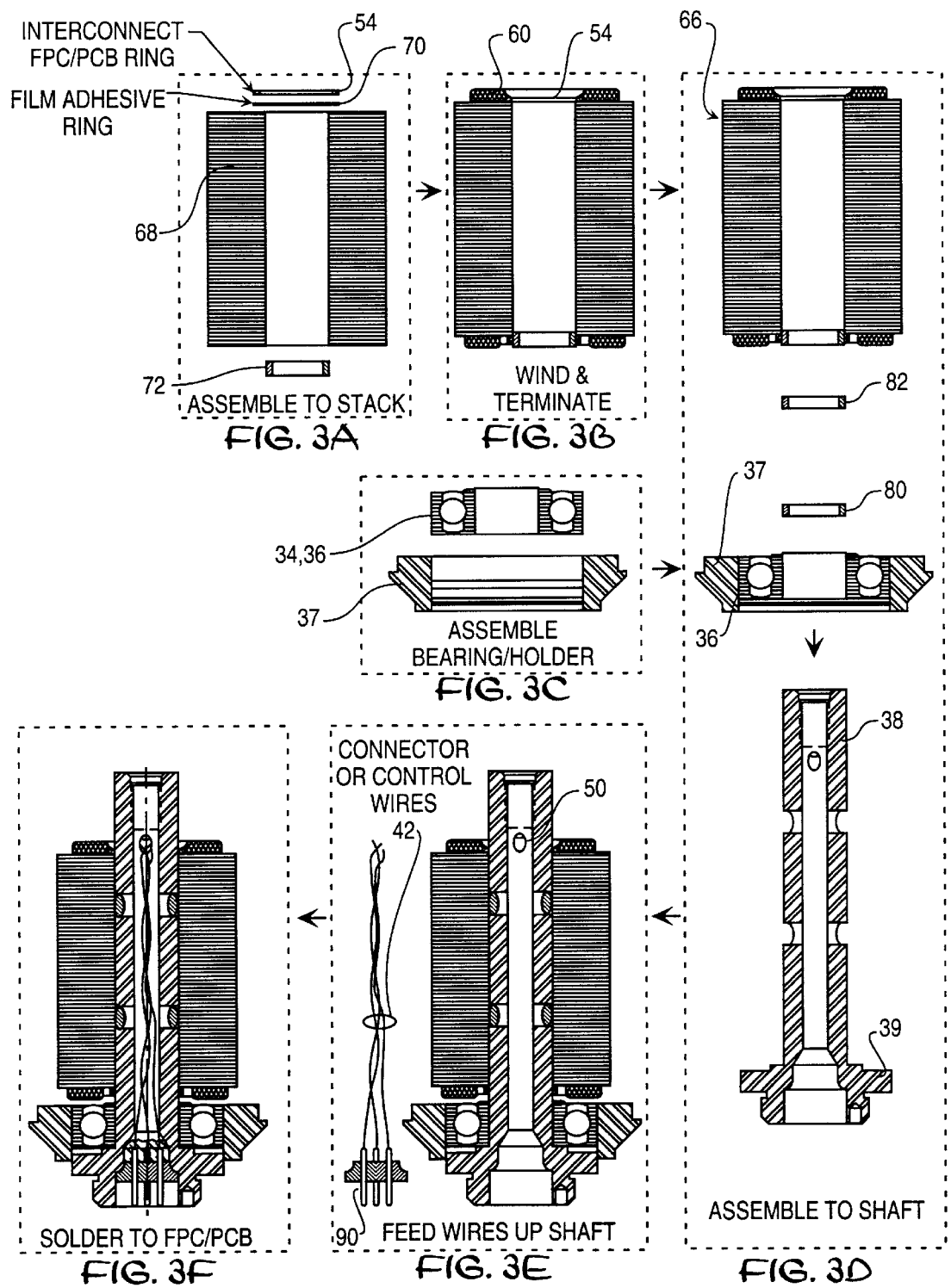

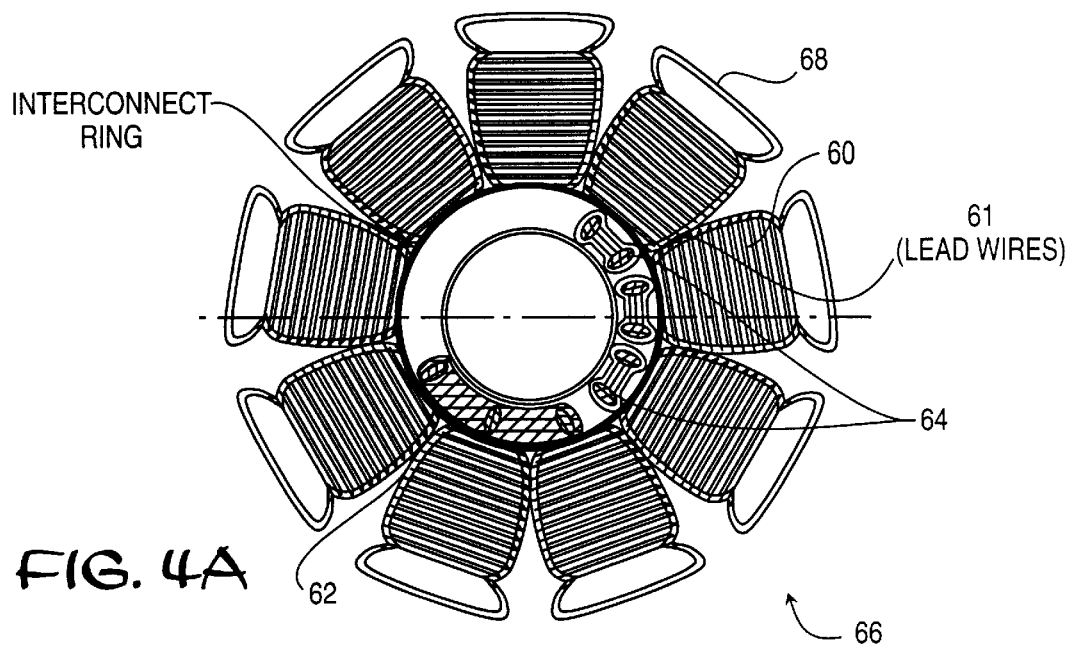
FIG. 4A
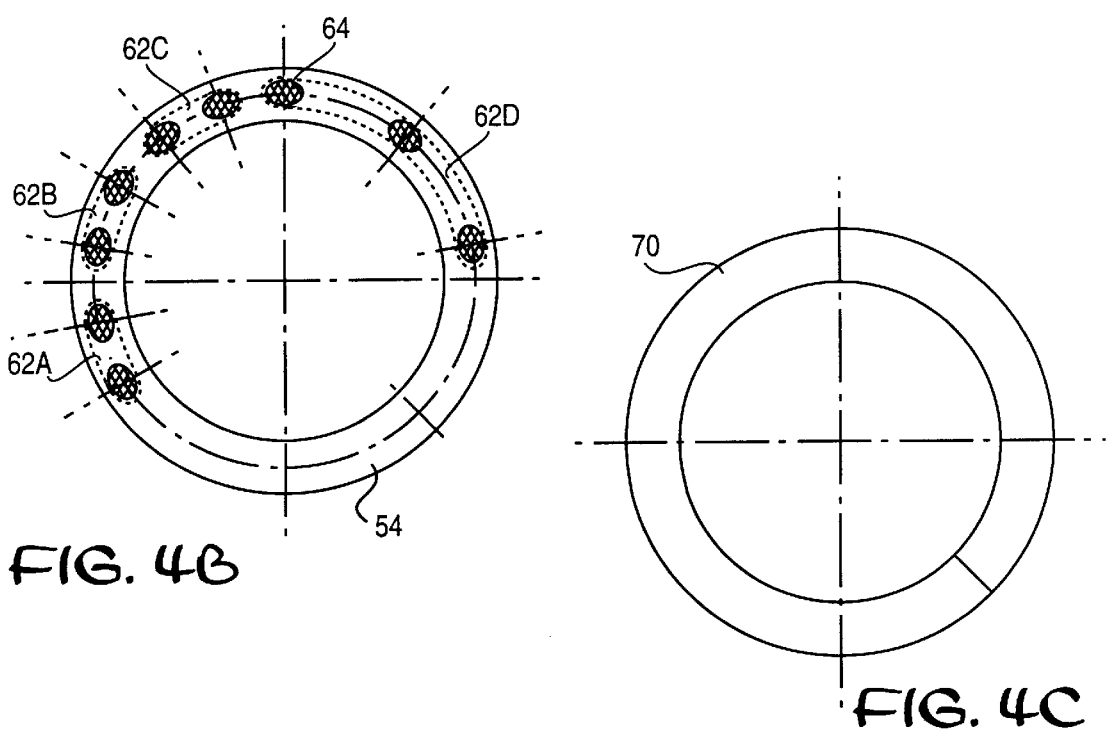
FIG. 4B
FIG. 4C

STATOR INTERCONNECT RING

FIELD OF THE INVENTION

This invention is directed generally to the field of spindle motors as used in disc drives, and more particularly to an improved structure and method for assembly of a spindle motor.

BACKGROUND OF THE INVENTION

Winchester disc drives are being used in computers to store increasingly large amounts of information while the cost of such storage is dropping dramatically. The typical Winchester disc drive is a system with a limited number of mechanical parts, including a spindle motor which mounts one or more discs for constant speed rotation, and an actuator carrying a transducer at one end and a voice coil motor at the other and operable in response to commands to the voice coil motor to position the transducer over a selected track to read and write data.

As one of the most expensive elements of a disc drive, as well as being one of the largest and most mechanically complex, many design efforts are intended to minimize the cost and increase the ease of assembly of the spindle motor. This particular invention is especially directed to improving spindle motor design and ease of assembly thereof, specifically in a spindle motor which incorporates a hollow shaft through which the wires to be connected to the stator are fed. It is apparent that it is essential to provide a reliable means for connecting these wires to the stator without taking additional axial space which could be used for larger stator and magnet. However, the assembly process as currently known can be complex, requiring spliced connections or the like. This could easily lead to loose wires on the stator which could result in a need to rework the motor or failure of the motor in its application. Further, the current assembly method which requires that the wires be fed through the hollow shaft and then soldered to lead wires extended from the stator is time consuming and costly. The time needed for testing the motor is also unduly lengthened.

SUMMARY OF THE INVENTION

Therefore, it is an object of the present invention to provide an improved spindle motor design for use in a disc drive.

A related objective of the invention is to provide a simplified spindle motor design which is subject to a simplified assembly process, eliminating splicing of connections and loose wires frequently associated with the stator assembly in the prior art.

Another related invention is to provide a stator design which can be easily tested as a unit for resistance, inductance, and continuity before assembly into the motor.

Another objective of the invention is to eliminate or dimminish the need for axial space reserved for making connections to the stator leads.

Yet a further objective of the invention is to provide an assembly process which simplifies the insertion of the lead wires through the hollow shaft of the motor to be soldered to the lead wires from the spindle motor stator.

These and other objectives of the invention are provided by a spindle motor incorporating a hollow shaft and a prewound stator incorporating an interconnect ring which is incorporated in and attached to one end of the stator assembly. The interconnect ring is preferably a printed circuit or flexible printed circuit which is fastened to an end of the stator stack before the stator has been wound. This interconnect ring is bonded to the stator stack before the coils are wound, and the start and finish of each phase winding is terminated to the interconnect ring. Once the stator is assembled onto the shaft, connector wires can be fed up through the shaft and terminated at the interconnect ring. Traces on the interconnect ring join the wires to the proper phases and to the commons to control motor operation.

The result of adopting this structure is to provide a motor shaft and stator assembly which is more easily and reliably assembled, wound and tested.

Other features and advantages of the present invention will be better understood by reference to the following figures and the detailed description of an exemplary embodiment given below in conjunction with these figures.

BRIEF DESCRIPTION OF THE DRAWINGS

FIGS. 3A–3F are a set of views showing an exemplary method of assembling the stator assembly of a spindle motor incorporating the present invention;

FIGS. 4A, 4B and 4C are top plan views of a stator assembly incorporating the interconnect ring of the invention, the interconnect ring itself, and an exemplary adhesive ring which could be used to fasten the interconnect ring to a stator.

DETAILED DESCRIPTION OF A PREFERRED EMBODIMENT

Figure 1:
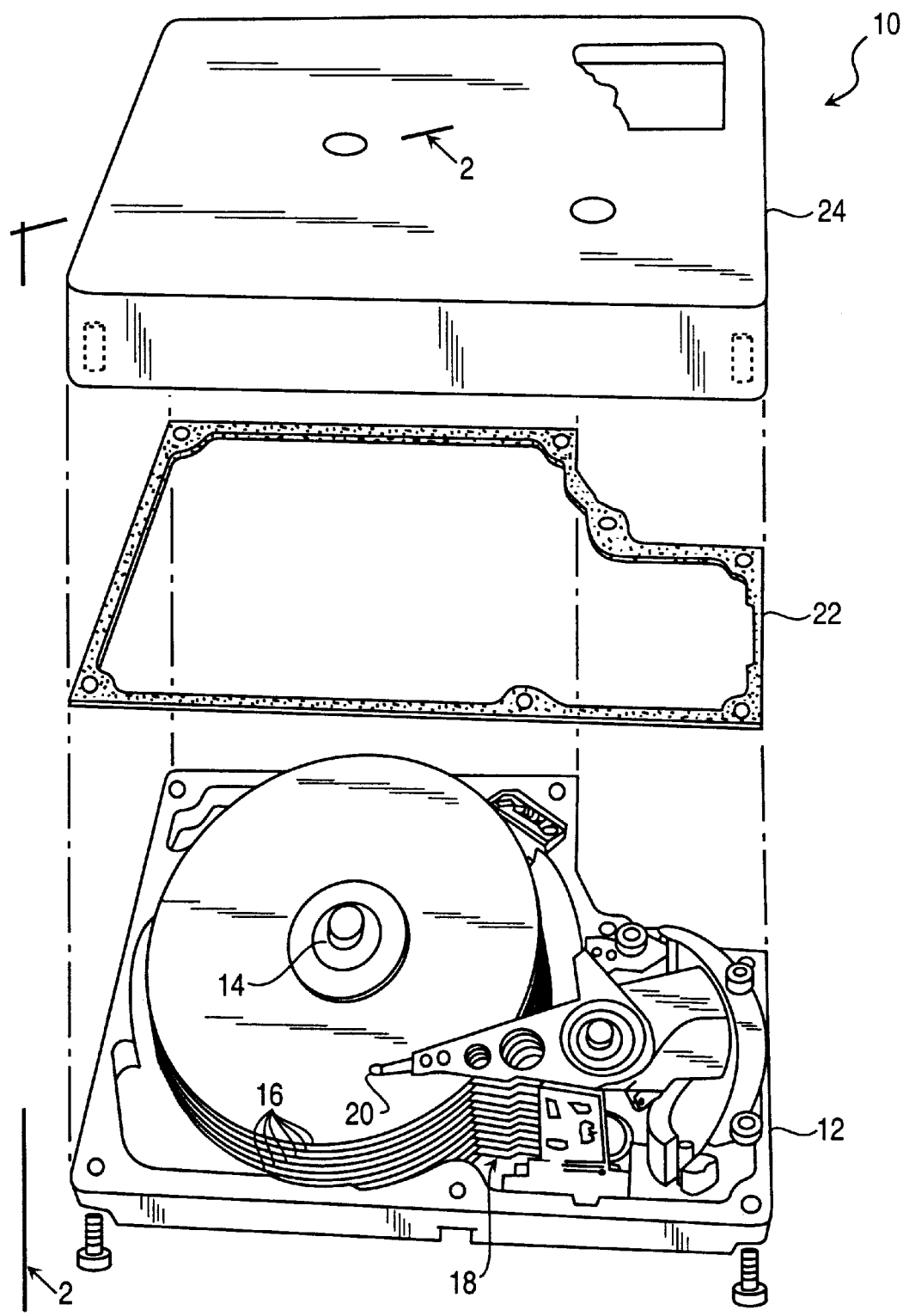
FIG. 1 is a plan view of a disc drive in which a spindle motor incorporating the present invention is useful.

FIG. 1 is an exploded perspective view of a magnetic disc drive storage system in which the present motor could be used. However, clearly this motor and the stator interconnection feature of the invention is not limited to the use with this particular design of a disc drive nor is it indeed limited for use only in disc drives. Rather, given the advantages of the invention, it could be useful in many motor designs to facilitate connecting wires to the stator leads, and especially to designs where the wires are led up through the hollow center of a motor shaft.

In the particular example of FIG. 1, the storage system 10 includes a housing base 12 having spindle motor 14 which carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a large number of radially differentiated tracks on the surface of the discs 16. This allows the transducers 20 to read and write magnetically encoded information on the surface of discs 16 at selected locations. Clearly, both cost of manufacture and a guarantee of long lifetime are critical to the successful manufacture and sale of disc drives. The spindle motor drives the discs at high speed for hours of operation daily over a period of years. Obviously, the electrical connections to be made cannot be susceptible to failure. Thus the inventive method for connecting wires to the stator coil windings of this invention has been implemented.

Figure 2:
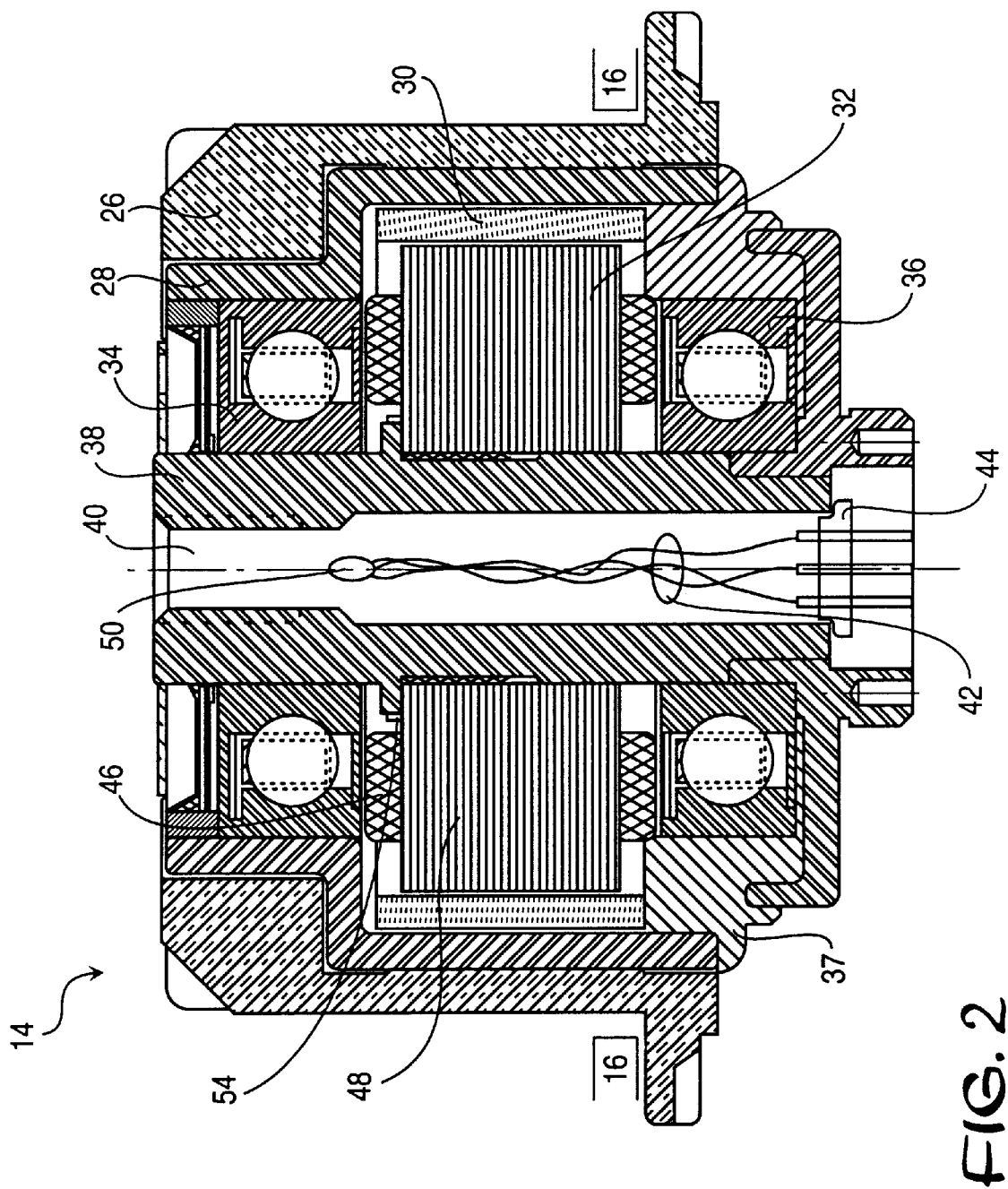
FIG. 2 is a vertical sectional view of a spindle motor designed in accordance with the present invention showing the stator interconnect ring and an exemplary method of leading wires through a hollow shaft of a motor to the interconnect ring.

Referring to FIG. 2, this figure is a vertical section of a motor which is of a type which could advantageously made use of the present invention. FIG. 2 shows a typical spindle motor design comprising a hub 26 which is supported from upper and lower bearings 34, 36 and combined with back-iron 28 supports magnet 30 for rotation outside stator 32. The inner race of the bearings 34, 36 is supported from a shaft 38 which in this instance is a hollow shaft having a cavity extending all or at least partway up the center. This cavity allows wires 42 to be led up from a connector 44 which brings power from an external controller to be applied to the windings 46 of the stator 48. The connection from the hollow center 40 of the shaft to the stator windings is made by feeding the wires through an opening 50 in the shaft out to a ring shaped flexible printed circuit or PCB 54 which is attached to an axial end of the stator yoke generally indicated at 48.

This interconnect ring 54, which provides a means for attaching the lead wires to ends of the stator coils or windings, is shown in greater detail in the top plan view of FIG. 4B and is further shown attached to the stator yoke in FIG. 4A. The interconnection ring 54 comprises a flexible printed circuit, a printed circuit board or the equivalent; it provides a means for both bonding to the ends of the coil windings 60 and also provides the necessary conductive traces 62 to join the phases together at 62a, 62b and 62c and the commons together at 62d so that proper motor operation immediately results from connecting the incoming lead wires to the solder pads 64 which are carried on the interconnection ring. To assemble the stator stack, this interconnection ring is placed at an axial end of the stator yoke 66 which supports the stator laminations 68. It is preferably adhered in place using an adhesive ring 70 of a film adhesive such as sold under the brand name "Ablefilm" and shown in FIG. 4C. Such adhesives are well suited to this application since they are clean and easily controlled for spreading. Other films, liquids, or tape adhesives can also be used in this application. After the interconnection ring 54 has been fastened in place, then the windings 60 are wound over the laminations 68 to complete the formation of the stator stack assembly.

The assembly of the salient parts of a stator and shaft assembly is illustrated in the sequence of FIGS. 3A–3F. FIG. 3A illustrates the interconnect ring 54, the adhesive ring 70 which is used to adhere it to the stack, and a stack support ring 72 in their respective relative orientation prior to assembly. Referring next to FIG. 3B, this shows the same stack 68 now with the windings 60 in place as well as the interconnect ring 54 at one axial end of the stack. In a parallel step shown in FIG. 3C, a bearing assembly 34, or 36 is assembled into a bearing holder 37. Referring next to FIG. 3D, final assembly begins with a shaft 38 having a feature 39 for locating the bearing assembly 36, 37, as well as supporting spacers 80, 82 and the completed stator assembly 66 shown in FIG. 3D and FIG. 4A When this assembly is completed, a connector plug 90 carrying the wires 42 is inserted into the end of the shaft, and the wires 42 are threaded up through the shaft and out through an appropriate opening 50 which may be of any form designed to allow the wires to reach the interconnection ring 54 (see FIG. 4A). They are terminated at the appropriate solder pads 64 of the interconnection ring 54. As noted, the traces provided on the interconnection ring join the proper phases and commons for optimum motor operation.

This invention provides a number of advantages, especially creating extra axial space which can be used to extend the stator, enhancing magnetic performance, rather than having to save space for making connections at the axial end of the stator. Also, simplification of the assembly process eliminates the need for spliced connections and potential loose wires on the stator. The stator can be tested early, as a unit, for resistance, inductance and continuity either at the stage shown in FIG. 3B before the expense of adding other bearings and the hub has come into play and while rework is still easily achieved or later as shown in FIG. 3F. Further, this assembly process allows the wires leading from the connector 90 to be cut to length and tinned for clean solder reflow connection to the interconnection ring.

Although the interconnection ring is shown as being ring or circular shaped, any arc segment length that can accommodate the solder pads and traces for providing connections between solder pads would be equally useful.

Other features and advantages of the present invention will become apparent to a person of skill in the art who studies the present invention disclosure. Therefore, the scope of the present invention is to be limited only by the following claims.

What is claimed is:

1. An improved motor stator assembly comprising:

a hollow shaft for supporting said stator, a plug connector carrying a plurality of connector wires which are to be led to connection points on said stator, said stator comprising a yoke, carrying a plurality of laminations, and windings on said yoke including lead wires which are led out to be connected to said connector wires, and a flat stator interconnect ring having first and second flat surfaces fastened flat against and on top of an end of said yoke and radially within the windings and having bonding pads on a first of said surfaces connected by appropriate interconnection traces thereon to connect selected ones of said bonding pads together, said stator lead wires and said connector wires being connected to said bonding pads so that control signals for energizing said stator may be passed through said connector to said stator interconnect ring to energize said motor.

2. An improved stator assembly as claimed in claim 1 wherein said interconnect ring comprises a flexible printed circuit having said bonding pads and said interconnection traces between selected ones of said bonding pads on said first surface thereof.

3. An improved stator assembly as claimed in claim 1 wherein said interconnect ring comprises a printed circuit board having said bonding pads and said interconnection traces between selected ones of said bonding pads on said first surface thereof.

4. An improved stator assembly as claimed in claim 1 including an adhesive ring between said interconnect ring and said stator yoke to fasten said interconnect ring firmly in place in said stator assembly.

5. An improved spindle motor comprising a central shaft adapted to be supported in a base of a disc drive, bearings mounted on said shaft and supporting a hub for rotation about said shaft, said hub supporting a magnet on an interior surface thereof, an integrated stator assembly supported on an outer surface of said shaft, said stator assembly comprising a yoke supporting a plurality of laminations, and windings on said yoke including lead wires which are led out to be connected to a stator interconnect ring fastened flat against and on top of an end of said yoke and radially within the windings and having bonding pads connected by appropriate traces on a first surface of said ring to connect selected ones of said bonding pads together and having control wires leading therefrom, said stator lead wires and said control wires being connected to said bonding pads so that control signals for energizing said stator may be passed through said connector to said stator, said stator interconnect ring having a second flat surface fastened to a top surface of said yoke, said ring not extending beyond said yoke, said fastening of said ring to said yoke not extending axially above or below said ring.

6. An improved spindle motor as claimed in claim 5 wherein said interconnect ring comprises a flexible printed circuit having bonding pads and interconnection traces between selected ones of said bonding pads on a surface thereof.

7. An improved spindle motor as claimed in claim 5 wherein said interconnect ring comprises a printed circuit board having said bonding pads and said interconnection traces between selected ones of said bonding pads on a surface thereof.

8. An improved motor assembly as claimed in claim 5 including an adhesive ring between said interconnect ring and said stator yoke to fasten said interconnect ring firmly in place in said stator assembly.

9. An integrated stator assembly adapted to be supported on an outer surface of a shaft, said stator assembly comprising a yoke supporting a plurality of laminations, and windings on said yoke including lead wires which are led out to be connected to a stator interconnect ring fastened flat against and on a top of an end of said yoke and radially within the windings, said stator interconnect ring extending only radially across said top of said stator and having first and second surfaces, said first surface having bonding pads connected by appropriate traces on said ring to connect selected ones of said bonding pads together and having control wires leading therefrom, said stator lead wires and said control wires being connected to said bonding pads so that control signals for energizing said stator may be passed through said stator interconnect ring to said stator windings.

10. An improved stator assembly as claimed in claim 9 wherein said interconnect ring axis, comprises a flexible printed circuit board.

11. An improved stator assembly as claimed in claim 9 wherein said interconnect ring comprises a printed circuit board.

12. An improved spindle assembly as claimed in claim 9 including an adhesive between said interconnect ring and said stator yoke to fasten said interconnect ring firmly in place in said stator assembly.

13. A stator interconnect ring having only first and second substantially flat composed surfaces and adapted to be utilized in combination with an integrated stator assembly supported on an outer surface of a motor shaft, said stator assembly comprising a yoke supporting a plurality of laminations, and windings on said yoke including lead wires which are led out to be connected to bonding pads on said first surface of said stator interconnect ring, said second surface being adhesively fastened flat against an end surface of said yoke and radially within the windings and having bonding pads connected by appropriate traces on said first flat surface on said ring to connect selected ones of said bonding pads together, said interconnect ring bonding pads adapted to bond wires thereto so that control signals for energizing said stator may be passed through said interconnect ring to said stator.

14. A stator interconnect ring as claimed in claim 13 wherein said interconnect ring comprises a flexible printed circuit.

* * * * *